United States Patent Office

2,860,956
Patented Nov. 18, 1958

2,860,956

PRODUCTION OF METALS AND THEIR COMPOUNDS

Thomas Victor Arden, Francis Hereward Burstall, Glynn Rees Davies, Reginald Patrick Linstead, and Ronald Alfred Wells, Teddington, England, assignors, by mesne assignments, to the United States of America as represented by the United States Atomic Energy Commission No Drawing. Application April 18, 1949
Serial No. 88,237

Claims priority, application Great Britain April 22, 1948

2 Claims. (Cl. 23—309)

This invention relates to the production of metals from their ores and the purification of metal compounds and is concerned with the preparation of metal compounds of a relatively high degree of purity from natural source materials or from impure compounds.

An object of the invention is to provide a simple and efficient process whereby compounds of metals may be prepared with a reduced impurity content or substantially free from impurities.

The invention is based on the observation that inorganic compounds, especially salts of metals, when in solution in organic solvents are retained by adsorbent materials to an extent which varies from compound to compound and separation of selected elements from others may be achieved by appropriate choice of adsorbent and organic solvent, acidity and the valency state and salt of the element.

The invention consists in separating completely or largely a metal from other metals present therewith by extracting salts of the said metal and the other metals with an organic solvent in the presence of an adsorbent material, which in the presence of the said organic solvent exhibits a different retentivity for the salt of the said metal and for the salts of the other metals.

Preferably in accordance with the invention the adsorbent material is arranged in the form of a column to which is added a mixture of the salts of the metals to be treated, all salts preferably having a common anion, and the mixture is subjected to the leaching action of an organic solvent which then passes through the column. The eluate will contain the salt of the desired metal in those cases where the adsorbent retains more strongly the salts of the impurities. In other cases where the desired metal salt is preferentially adsorbent or retained, impurities will be carried off in the eluate. Where a desired metal salt or salts and the salts of the impurities all pass through the column but at different rates, a fraction or fractions of the eluate containing the desired metal salt or salts may be isolated and treated for recovery of the said metal salt or salts.

The mixture of metal salts to be treated, preferably all having a common anion, may be added to the column as finely powdered solids, or a slurry or concentrated aqueous solution. In the latter case the solution is preferably taken up in a small amount of the adsorbent which is then added to the top of the column. Alternatively a solution of the salts in an organic solvent may be added directly to the top of the column. In all cases leaching of the added salts is carried out by pouring further organic solvent through the column.

As an alternative to the use of a column of adsorbent, successive treatments of a solution of the metal salts in an organic solvent with small quantities of adsorbent may be employed, the desired salt being recovered from the adsorbent or treated solution according to the conditions of adsorption.

The preferred adsorbent material is cellulose, desirably paper pulp, but cotton or scoured cotton may be used. Paper pulp may be prepared for use in the invention by pulping in water ash-free cellulose pulp, such as is used for filtering purposes, or by disintegrating in water paper of the kind used for filtering, then filtering the resulting slurry and partially drying it as in a vacuum oven. As complete drying may lead to formation of hard lumps difficult to break up, it is preferred to maintain the cellulose pulp moist by adding thereto the organic solvent with which it is proposed to use it. Activation of the pulp by treatment with nitric acid had been found to increase the adsorptive qualities in some cases. The activation treatment may be effected by adding to the partially dried cellulose pulp referred to above sufficient concentrated nitric acid to wet it and allowing it to stand for a few minutes with the nitric acid and/or boiling it with dilute nitric acid. Water is then added and the slurry is filtered and washed until the filtrate is no longer acid. The pulp may then be shaken with alcohol, again filtered and stored either moistened with alcohol or ether or other organic solvent. Activation may also be effected by treatment of the partially dried pulp with a 4 percent hypobromite solution in place of nitric acid.

To prepare an adsorbent column for use according to the invention a tube of glass porcelain or other inert material having a stop-cock or valve at one end is employed. For use with organic solvent immiscible with water it has been found advantageous to give the inner wall of the tube a coating of a water repellent substance preferably dichlordimethyl silane, for example by shaking a small quantity of the substance in the tube, or otherwise coating the inner wall, removing excess and washing with alcohol. A perforated porcelain plate is then placed at the bottom of the tube to support the adsorbent column. The tube is partically filled with the desired organic solvent and the adsorbent added in small portions at a time, each portion being stirred up with the organic solvent and gently tamped down with a plunger having a flattened head slightly smaller in diameter than the inside diameter of the tube. Voids and irregular packing through which channelling of the solvent may take place are to be avoided in preparing the column. Sufficient adsorbent is used to form a column approximately 10 to 25 cm. deep. If the pulp is not ash-free, a preliminary leaching with the organic solvent or solvent acid mixture is desirable before adding the salts to be treated.

Other adsorbents which may be employed are activated alumina, calcined ball clay, alginic acid and cation exchange resins. Calcined ball clay may introduce iron as an impurity. A plurality of adsorbents may be employed so as to take advantage of their different retentivity for different impurities.

Among solvents which may be employed according to the invention are ethers and ketones, for example diethylether, tetrahydropyran, acetone, methyl-n-propyl ketone also methyl acetate, ethyl butyl cellosolve and ethyl alcohol. Addition of the acid corresponding to the anion of the salt being treated has been found to be advantageous in some cases, amounts of from 0.5 to 12.5 percent by volume of the concentrated acid being appropriate. The concentration of acid has been found to affect rate of passage of some salts through a column of adsorbent.

In carrying the invention into effect, the conditions for separating a desired metallic element from other metallic elements may be determined by observing the effect of a chosen adsorbent substance on salts of the said element and other elements to be removed in the presence of an organic solvent, both in the presence and absence of the acid corresponding to the anion of the salt. The conditions giving substantially different retentivity for a salt of the desired element and for salts of the elements to be removed may then be used for effecting a separation. Thus employing cellulose pulp as adsorbent, metal nitrates and diethyl ether containing 12.5 percent by volume of nitric acid (d.=1.42), scandium may be separated from yttrium, cerium, praseodymium neodymium, lanthanum, samarium, ytterbium, holmium and calcium, and zirconium may be separated from hafnium. Mercury may be separated from copper and cadmium as chlorides using methyl acetate as solvent and a cellulose pulp adsorbent. The presence of sodium phosphate in the absorbent will render possible separation of mercury from bismuth also in that case. With cellulose pulp zirconium may be separated from hafnium as nitrates using ethyl butyl Cellosolve containing 20 percent nitric acid (density 1.42) as solvent. Gold may be separated from platinum, palladium and iridium as chlorides using a cellulose pulp adsorbent and ether containing 0.5 percent of dry hydrochloric acid. Also using cellulose pulp and chlorides of the metals iridium may be separated from platinum and palladium by means of acetone containing hydrochloric acid; and the same adsorbent and organic solvent medium may be used for separating rhodium from platinum, palladium and iridium as chlorides.

The following are examples of ways of carrying the invention into effect, the cellulose referred to in each case being of the kind employed for the production of absorbent paper, preferably filter paper, or the production of nitro-cellulose; and where "activated cellulose" is mentioned it is intended to refer to the product produced by treatment of such cellulose with nitric acid as described above.

EXAMPLE 1

Nickel chloride may be separated from other metal chlorides by employing an adsorbent column of cellulose pulp prepared as described above and acetone containing 1 percent by volume of concentrated hydrochloric acid. Nickel is strongly retained on the adsorbent under such conditions while the following elements pass through the column: copper, lead, mercury, arsenic, molybdenum, gold, platinum, palladium, iron, vanadium, zinc, cobalt and magnesium. Tin, titanium, zirconium, chromium and manganese do not move so readily through the column and therefore require a greater volume of solvent to obtain satisfactory separation.

In proceeding according to the example a substance, for example an ore or mixture containing nickel is converted into an aqueous chloride solution, which is added to a column as desribed above and the chlorides are leached with acetone containing 1 percent by volume of concentrated hydrochloric acid. When the effluent solvent shows no metal salt or a negligible amount, leaching is discontinued and the nickel salt is washed from the column with water or with alcohol containing a little hydrochloric acid. Any aluminium, lanthanum and alkaline earth metal chlorides present as impurities are adsorbed and recovered with the nickel salt.

Methyl-n-propyl ketone may be substituted for the acetone of the example to obtain similar results. If chromium or manganese are present as impurities, however, the acid content of the ketone is raised in this case to 10 percent by volume to facilitate the removal of such metal chlorides.

EXAMPLE 2

*Separation of mercury from copper, cadmium and bismuth*

A sample containing mercuric chloride (0.2046 g.), bismuth carbonate (0.2 g.), cadmium chloride (0.2 g.) and copper chloride (0.2 g.) was dissolved by treatment with 5% HCl (1 ml.) followed by addition of just enough conc. HCl to complete solution. This liquid mixture was soaked up on a wad of activated cellulose and transferred to the top of a column of cellulose prepared in the following manner: a glass tube (25 cm. long 2 cm. diam.) was packed to a length of 10 cm. with cellulose by agitation with methyl acetate to provide a smooth and uniform packing. A wad of pulp containing 10 ml. of a saturated sodium phosphate solution is then packed in the column as a bismuth trap, followed by a portion (2.5 cm. long) of untreated pulp on top of the phosphate trap. The wad containing the sample was then added to the column. This composite column was leached with methyl acetate (150 ml.). The eluent was then treated with $H_2S$ in hot solution which was allowed to cool and left for some hours. The mercuric sulphide was filtered, dried and weighed (0.1746 g.). The yield of mercury was 99.9% of the quantity originally present and spectographic analysis failed to reveal any copper, cadmium or bismuth. The object of the sodium phosphate trap mentioned above was to retain bismuth which otherwise contaminated the mercury in the methyl acetate extract.

EXAMPLE 3

Vanadium in nitric acid solution may be separated from other metals present as nitrates, or in nitric acid solution, by employing as solvent diethyl ether containing about 5 percent by volume of nitric acid (1.42 S. G.) and a column of cellulose pulp activated as described above. Vanadium travels through the column at a greater rate than lead, silver, copper, cadmium, germanium, arsenic, tin, antimony, tungsten, iron, chromium, aluminium, rare earth metals, titanium, zirconium, gallium, zinc, nickel, cobalt, manganese, alkaline earth and alkali metals, and effluent solvent substantially free from such metals and containing the vanadium may be obtained.

EXAMPLE 4

A mixture of nickel, cobalt and ferric chlorides was added to a column of cellulose pulp prepared as described above and moistened with alcohol and leached with ethyl alcohol as organic solvent. Cobalt chloride was recovered in the first portion of the effluent. Iron and nickel travelled down the column more slowly in that order.

A similar mixture of the chlorides, applied to a column of cellulose pulp prepared as described above and moistened with ethyl alcohol containing 1 percent of hydrochloric acid by volume, was leached with similar acidified ethyl alcohol. Ferric chloride was present in the first portion of the diluent and cobalt and nickel chlorides were in later portions in that order and could be collected separately.

EXAMPLE 5

*(a) Separation of scandium from elements of the rare earths series*

A sample containing $Sc_2O_3$ (0.128 g.), $Yt_2O_3$ (0.25 g.) and the oxides of Ce, Pr, Nd, La, Sm (0.1 g. of each) and Yb, Ho (0.01 g. of each) was dissolved in 20% v./v. $HNO_3$ (7 ml.) and the ceric salt reduced by addition of $H_2O_2$ (0.5 ml. 20 vol.) followed by boiling. The cold mixture was then taken up on a wad of cellulose which was transferred to the top of a tube (2 cm. diam.) containing a column of cellulose (20 cm. long), previously prepared, using ether-nitric acid (12.5% v./v. d. 1.42 $HNO_3$) solvent. Ether solvent mixture (12.5% $HNO_3$), 650 ml., was then passed through the absorbent column. The eluent solvent after dilution with water and distillation of solvent followed by evaporation and calcination to oxide yielded 0.115 g. of $Sc_2O_3$ which was shown by spectrographic analysis to be free from rare earths. The yield was 89.8% of the $Sc_2O_3$ in the original sample.

*(b) Separation of scandium from calcium*

A mixture of scandium (0.15 g.) and calcium (0.1 g.) as nitrates was treated as shown in Example 5(a) in a cellulose column with ether nitric acid (12.5% v./v. $HNO_3$) mixture (1 l.) All except 1 mg. of scandium (i. e. 99%) was recovered from the eluent. Movement of calcium was not detected.

It has also been observed that titanium, samarium, lead, iron, cobalt, nickel and copper are not extracted by diethyl ether containing 12.5 percent nitric acid under the above conditions.

EXAMPLE 6

*Separation of zirconium from hafnium*

(a) A mixture containing $ZrO_2$ (0.314 g.) and $HfO_2$ (0.075 g.) was dissolved in 5 ml. of 60% nitric acid, soaked up in a wad of activated cellulose and transferred to the top of a tube packed with cellulose to a length of 15 cm. by agitating with a solvent mixture containing ether 87.5% and nitric acid (d. 1.42) 12.5% by volume until a smooth uniform column was obtained. Ether-nitric acid (12.5%) mixture (600 ml.) was then allowed to percolate through the absorption tube and the zirconium recovered from the emergent liquid from the bottom of the column by evaporation and calcination. Zirconia (0.1942 g., 48.7% of the total present in the wad) was recovered and spectrographic analysis showed this oxide to be free from hafnia. Analysis of the cellulose column indicated a small quantity of hafnia at the bottom and a high proportion at the top of the column.

(b) A sample of zirconia (0.13 g.) containing approximately 20% hafnia was fused with potassium hydroxide, the melt leached with water and filtered. The residue was treated with nitric acid, evaporated just short of dryness, conc. HNO (2 ml.) added, the mixture boiled and water added until complete solution was obtained. This solution was evaporated to 3 ml., taken up in a wad of prepared cellulose and transferred to the top of a column (17 cm. long) prepared from cellulose and ethyl butyl Cellosolve (ethyl butyl ether of ethylene-glycol) containing 20% v./v. $HNO_3$ (d. 1.42). Extraction was then carried out with the ethyl butyl Cellosolve and nitric acid (20%) mixture until 182 ml. of eluent had been collected. Percolation of this solvent through the column was slow. The emergent solvent contained 73% of the zirconia (0.1095 g.) which now contained only traces of hafnia. Spectrographic analysis of the cellulose column indicated a high proportion of hafnia remaining in this absorbent.

EXAMPLE 7

*Separation of gold from platinum, palladium and iridium*

A mixture containing gold (0.1262 g.), platinum (0.04 g.), palladium (0.15 g.) and iridium (0.15 g.) in the form of soluble chlorides in 5 N hydrochloric acid solution (0.5 ml.) was soaked up in a wad of activated cellulose and transferred to an adsorption tube containing a column (15 cm. long) of activated cellulose pulp. This column was prepared by agitating the cellulose with ether containing 0.5% dry HCl to obtain a smooth and uniform column. This solvent mixture (250 ml.), prepared by passing hydrogen chloride gas into ether until the required concentration was obtained, was allowed to percolate through the cellulose column. Gold (0.1270 g.) 100.6% was recovered from the eluent. Platinum, palladium and iridium were not detected in this recovered gold by chemical test.

EXAMPLE 8

*Separation of iridium from platinum and palladium*

(a) A mixture containing platinum (0.1 g.), palladium (0.1 g.) and iridium (0.1 g.) as chlorides in 2 N-HCl (2 ml.) was reduced with $SO_2$ by passing the gas through the solution; iridium was thus reduced to the tervalent condition. The liquid was then soaked up in a wad of cellulose and transferred to the top of a column of cellulose (15 cm. long) prepared in the presence of dry acetone (obtained by boiling acetone with solid potash and potassium permanganate, followed by distillation) containing 2% conc. HCl, the acid being added shortly before use. Acetone-2% HCl mixture (200 ml.) was then passed through the column; practically the whole of the platinum and palladium was extracted and recovered from the eluent, whereas iridium remained in the cellulose column and could be recovered by leaching with dilute aqueous hydrochloric acid or ashing the cellulose to yield iridium oxide substantially free from platinum and palladium.

(b) A sample containing 0.1 g. each of Pt, Pd and Ir as chlorides in N-HCl (4 ml.) of solution was reduced with $SO_2$ as in Example 5(a), soaked up on a wad of cellulose and transferred to a tube packed with cellulose (20 cm. long) in the presence of dry acetone containing 5% conc. HCl. On leaching with this solvent mixture, practically the whole of the platinum and palladium were extracted in the first 100 ml. while iridium remained in the cellulose column. Addition of a further 50 ml. of solvent showed a small extraction of iridium which appeared in the eluent but the main proportion of this metal remained in the column forming a diffuse coloured band. Platinum and palladium were not detected in the column at this stage.

EXAMPLE 9

*Separation of rhodium from platinum, palladium and iridium*

In this separation rhodium was held back in the column as sodium rhodichloride ($Na_3(RhCl_6)$) while platinum, palladium and iridium were extracted.

A mixture containing platinum (0.3844 g. of $H_2PtCl_6$), palladium (0.3156 g. of $PdCl_2$), iridium (0.2032 g. of $IrCl_3$) and rhodium (0.2032 g. of $RhCl_3 2H_2O$) was fused with $Na_2O_2$ (2.5 gms.) and the melt taken up in dil. HCl and filtered. The residue was fused with a further portion of $Na_2O_2$ (2.5 g.) and leached again with dil. HCl when complete solution was achieved. The bulked solutions were evaporated to 10 ml. and dry acetone (25 ml.) added, followed by paper pulp (3 g.). This material was agitated with dry acetone containing 5% conc. HCl (25 ml.) and the liquor decanted through a column of cellulose (15 cm. long) prepared in the presence of acetone-HCl (5%) solvent mixture. The sample in the cellulose wad was stirred with successive 25 ml. portions of solvent mixture which were then poured through the column, this process being continued until 275 ml. of eluent were collected. At the conclusion of this extraction process it was found that practically all the rhodium remained in the wad with only a slight contamination due to palladium. The column contained only a trace of rhodium.

The eluents from the foregoing which were collected separately in 25 ml. portions were combined together as follows: (a) 0 to 50 ml. no metals detected; (b) 50 to 100 ml. containing the bulk of the Pt, Pd and Ir but free from Rh, (c) 100 to 275 ml. containing traces of Pt, Pd, Ir and Rh.

The fraction (c) mixed with the wad containing the rhodium was evaporated to dryness, the residue treated with dry acetone (20 ml.) and cellulose pulp. This mixture was leached with acetone containing 10% conc. HCl, the liquors being poured through a 20 cm. cellulose column prepared in the presence of acetone containing 10% conc. HCl. This process of extraction was continued with 25 ml. portions of solvent until 200 ml. eluent was obtained. The top section of the column and the wad contained nearly all the rhodium free from Pt, Pd and Ir.

EXAMPLE 10

*The separation of iridium from platinum and palladium after removal of rhodium*

The solvent collected in the foregoing example contained small quantitites of Pt, Pd and Ir in the first 150 ml. and this solvent was combined with fraction (b) from the first solvent treatment (vide supra). The solvent was removed by distillation and the residue dissolved in N-HCl (4 ml.) and the solution treated with SO₂ gas to reduce iridium to the tervalent condition. This reduced solution was taken up on a wad of cellulose, transferred to the top of a column (20 cm. long) prepared as described in Example 9(b) and extracted with acetone containing 5% conc. HCl (125 ml.). Under these conditions, platinum and palladium were extracted almost entirely by the first 125 ml. of solvent, whereas nearly pure iridium was contained in the final 50 ml. of solvent eluent. The cellulose column and the wad contained the bulk of the iridium free from platinum and palladium. The iridium was recovered from the solvent by distillation and from cellulose by extraction with dilute aqueous hydrochloric acid or calcination to oxide.

In all cases, the solutions of desired salts recovered according to the examples may be worked up to produce other compounds or the metals. Solvents may be recovered by distillation, and purified for further use.

We claim:

1. A method of separating zirconium nitrate from hafnium nitrate wherein the said nitrates in admixture are added to a mass of cellulose pulp, the nitrates of the metals and the cellulose pulp are eluted with diethyl ether containing 12.5 percent by volume of nitric acid of density 1.42 and the eluent is caused to pass through a column of cellulose pulp and effluent from the column containing zirconium nitrate substantially free from hafnium is collected.

2. A method of separating zirconium nitrate from hafnium nitrate wherein the nitrates of the metals in admixture are added to a mass of cellulose pulp, the nitrate of the metals and the cellulose pulp are eluted with ethyl butyl cellosolve containing 20 percent by volume of nitric acid of density 1.42 and the eluent is caused to pass through a column of cellulose pulp and effluent from the column of zirconium nitrate substantially free from hafnium is collected.

References Cited in the file of this patent

UNITED STATES PATENTS

| | | |
|---|---|---|
| 1,423,070 | Bardt | July 18, 1922 |
| 1,966,729 | Loomis | July 17, 1934 |
| 2,075,179 | Cunningham | Mar. 30, 1937 |
| 2,162,936 | Burrell | June 20, 1939 |
| 2,184,943 | Pattock | Dec. 26, 1939 |
| 2,227,833 | Hixson et al. | Jan. 7, 1941 |
| 2,249,761 | Hixson et al. | July 22, 1941 |

OTHER REFERENCES

Williams: An Introduction to Chromatography, 1947, Chemical Publishing Co., Inc., Brooklyn, N. Y., pp. 17–21, 57–63.

Strain: Chromatographic Adsorption Analysis, 1945, Interscience Publishers Inc., New York, N. Y., pp. 41–53, 77–82, 194.